United States Patent Office 3,778,445
Patented Dec. 11, 1973

3,778,445
PHENOXYALKYLOXAZOLINES
Richard J. Timmons and William E. Gallant, Marysville, Ohio, assignors to The O. M. Scott & Sons Company, Marysville, Ohio
No Drawing. Filed June 28, 1971, Ser. No. 157,711
Int. Cl. C07d 85/36
U.S. Cl. 260—307 F     3 Claims

ABSTRACT OF THE DISCLOSURE

Compounds of the formula

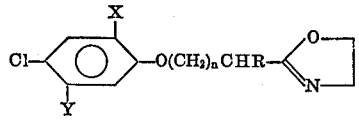

where X is hydrogen, chlorine, or methyl; Y is hydrogen or chlorine, $n$ is 0 or 2; and R is hydrogen or methyl when $n$ is 0 and hydrogen when $n$ is 2. Examples of compounds with the foregoing formula are:

2-(2,4-dichlorophenoxymethyl)-2-oxazoline
2-[3-(2,4-dichlorophenoxy)propyl]-2-oxazoline
2-[1-(2,4,5-trichlorophenoxy)ethyl]-2-oxazoline
2-[1-(2-methyl-4-chlorophenoxy)ethyl]-2-oxazoline
2-(2-methyl-4-chlorophenoxymethyl)-2-oxazoline
2-(4-(chlorophenoxymethyl)-2-oxazoline.

Also disclosed are methods of preparing compounds with the foregoing structural formula, methods of using such compounds as herbicides and as growth regulators, and herbicidal and growth regulator formulations including such compounds.

---

This invention relates to herbicidally active phenoxyalkyloxazolines and, more particularly, to certain novel 2-(phenoxyalkyl)-2-oxazolines and to their use as selective herbicides and as growth regulators.

The novel compounds we have invented are those of the formula:

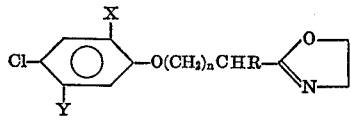

(I)

where X is hydrogen, chlorine, or methyl; Y is hydrogen or chlorine; $n$ is 0 or 2; and R is hydrogen or methyl when $n$ is 0 and hydrogen when $n$ is 2.

We have discovered that the foregoing compounds are selective herbicides and are particularly useful as post-emergent controls for controlling the growth of dicots in monocots.

As indicated above, our invention consists in one aspect of the invention of the compounds of the Formula I. Representative of these compounds are those which follow.

Code number:      Name of compound
   323   ____ 2 - (2,4 - dichlorophenoxymethyl) - 2-oxazoline.
   458   ____ 2 - [3 - ( 2,4 - dichlorophenoxy)-propyl]-2-oxazoline.
   400   ____ 2 - [1 - (2,4,5 - trichlorophenoxy)ethyl]-2-oxazoline.
   462   ____ 2-[1-(2 - methyl-4-chlorophenoxy)ethyl]-2-oxazoline.
   468   ____ 2-(2-methyl - 4 - chlorophenoxymethyl)-2-oxazoline.
   472   ____ 2-(4-chlorophenoxymethyl)-2-oxazoline.

The compound we have invented act in a manner which is typical of auxin herbicides. For example, plants treated with these chemicals show epinasty (twisting and curling of stems and leaves). As indicated above, they give post-emergence control of dicots but has little post-emergence effect on grass species. This combination of properties makes them particular valuable for the control of broadleaf weeds in turf.

Heretofore available auxin herbicides which give control of broadleaf weeds in turf all have serious drawbacks. Pyridines, such as 4-amino-3,5,6-trichloropicolinic acid (Picloram) and methoxybenzoic acids such as 2-methoxy-3,6-dchlorobenzoic acid (Dicamba) are extremely mobile in the soil and are rapidly taken up by the roots of trees and shrubs. Thus, they commonly cause damage to trees and ornaments when applied to turf.

The phenoxyalkanoic acids such as 2,4-dichlorophenoxyacetic acid (2,4-D) damage desirable grasses when applied at other than the specific recommeded rates or under conditions when the grass does not have full vigor. For example, it is not practical to apply 2,4-D to Bermuda grass for broadleaf weed control during the dormant season because of the turf damage which will result.

Certain phenoxyalkanoic acids are also suspected of causing terratogenic effects due to contamination by highly terratogenic dioxins. An example is 2,4,5-trichlorophenoxyacetic acid.

The compounds of this invention do not have these disadvantages of previously known auxin herbicides. They are not readily taken up by plant roots (thus preventing tree and ornamental damage), show exceptionally good turf tolerance, and in most cases, are free of terratogenic dioxin contaminants.

As indicated above, certain of our novel compounds also possess growth regulator type activity. This is of course a valuable property—for example, in the case of turf grasses, mowing frequency is reduced, making turf maintenance less onerous.

These compounds we have invented can be synthesized by the rearrangement of aziridinyl amides with sodium iodide in acetone as shown by the following equation:

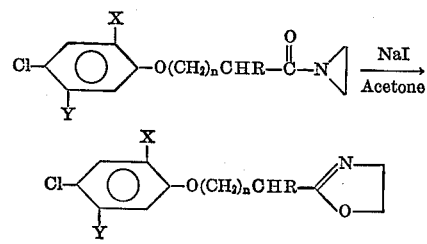

Alternately, they may be prepared by base-catalyzed cyclization of β-chloroethyl amides as shown by the reactions reproduced below:

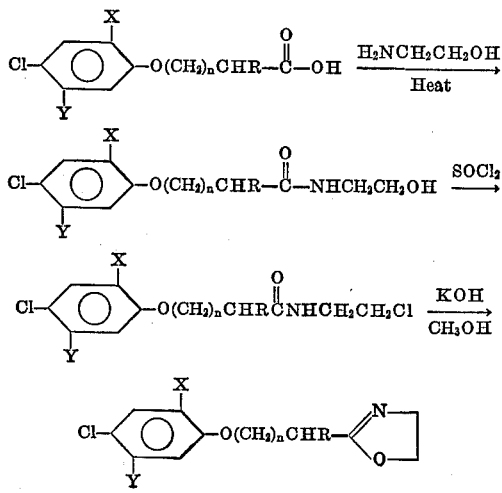

As is apparent from the foregoing, one important and primary object of the invention resides in the provision of the compounds of Formula I.

Another important and primary object of the invention resides in the provision of certain novel selective herbicides which do not have the disadvantages of and are therefore improvements over those heretofore available.

A related and important object of the invention resides in the provision of novel 2-(phenoxyalkyl)-2-oxazolines which are useful as selective post-emergent controls for broadleaf weeds in turfs.

Another object of the invention resides in the provision of novel 2 - (phenoxyalkyl) - 2 - oxazolines which have growth regulating type activity.

Yet another object of the invention resides in the provision of novel herbicidally effective compositions which include compounds of Formula I.

Other important objects and features and additional advantages of the invention will become apparent from the appended claims and from the ensuing detailed description and discussion.

As indicated above, the compounds of the present invention can be made by rearranging aziridinyl amides with sodium iodide in acetone. The following examples illustrate the preparation of the aziridinyl starting compounds.

EXAMPLE I

Preparation of N-(2,4-dichlorophenoxyacetyl) aziridine

Sixteen and eight-tenths grams (16.8 g., 0.07 mole) of 2,4-dichlorophenoxyacetyl chloride was added slowly to a mixture of 85 g. of crushed ice, 90 ml. of benzene, 2.8 g. (0.07 mol) of sodium hydroxide, and 3.0 g. (0.07 mole) of aziridine while the temperature was held below 5° C. with an ice bath. The addition was slightly exothermic. The reaction mixture was stirred vigorously below 5° for 2 hours. The layers were separated and the aqueous layer extracted with three 35 ml. portions of ether. The ether extracts were combined with the benzene layer and dried over $MgSO_4$. The solvent was removed at a temperature below 40° with a rotary evaporation to give 13.2 g. of a solid having a melting point of 84–88° C.

Chemical analysis.—Calculated for $C_{10}H_9Cl_2NO_2$ (percent): C, 48.8; H, 3.69; N, 5.79; Cl, 28.8. Found (percent): C, 49.35; H, 3.90; N, 5.65; Cl, 26.90.

Infrared analysis.—$5.81\mu$ (C=O); $7.28\mu$ (aziridinyl symmetrical ring breathing).

EXAMPLES II–V

Additional aziridinyl amides were prepared in a manner analogous to that described in Example I. These compounds, their physical characteristics, and their chemical and infrared analysis are listed below:

N-[4-(2,4-dichlorophenoxy)butyryl]aziridine—
Light yellow viscous oil

Chemical analysis.—Calculated for $C_{12}H_{13}Cl_2NO_2$ (percent): C, 52.6; H, 4.78; N, 5.11; Cl, 25.9. Found (percent): C, 52.83; H, 4.48; N, 6.27; Cl, 25.44.

Infrared analysis: $5.90\mu$ (C=O); $7.95\mu$ (C—O).

N-[2-(2,4,5-trichlorophenoxy)propionyl]aziridine—
Pale yellow oil

Infrared analysis.—$5.94\mu$ (C=O); 7.26 or $7.40\mu$ (symmetrical) aziridine ring breathing).

N-[2-(4-chloro-2-methylphenoxy)propionyl]aziridine—
Colorless liquid

Chemical analysis.—Calculated for $C_{12}H_{14}ClNO_2$ (percent): C, 60.2; H, 5.88; N, 5.84; Cl, 14.81. Found (percent): C, 60.80; H, 5.72; N, 7.13; Cl, 15.90.

Infrared analysis.—$5.90\mu$ (C=O); $8.03\mu$ (C—O); $7.25\mu$ (aziridine symmetrical ring breathing).

N-(2-chlorophenoxyacetyl)aziridine—White solid
melting point 81.5–83.5° C.

Chemical analysis.—Calculated for $C_{10}H_{10}ClNO_2$ (percent): C, 56.75; H, 4.77; N, 6.63. Found (percent): C, 56.68; H, 4.22; N, 7.29.

Infrared analysis.—$5.85\mu$ (C=O); $8.00\mu$ (C—O); $7.50\mu$ (aziridine symmetrical ring breathing).

The following example illustrates the conversion of the aziridine compound prepared as described in Example I to a 2-(phenoxyalkyl)-2-ozazoline, a compound of the present invention.

EXAMPLE VI

Preparation of 2-(2,4-dichlorophenoxymethyl)-2-oxazoline

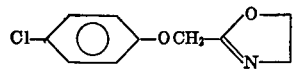

A mixture of 6.2 g. (0.025 mole) of (2,4-dichlorophenoxy)acetylaziridine and 3.0 g. (0.02 mole) of sodium iodide in 100 ml. of acetone was refluxed for 20 hours. The acetone was removed with a rotary evaporator, and the residue was stirred with 15 ml. of water. The insoluble material was filtered off and recrystallized from 50% aqueous ethanol. The product was dried in vacuo over $P_2O_5$ at room temperature to give 4.1 g. of a solid, melting point 70.9–74.9°.

Chemical analysis.—Calculated for $C_{10}H_9Cl_2NO_2$ (percent): C, 48.8; H, 3.69; N, 5.79; Cl, 28.8. Found (percent): C, 48.78; H, 4.10; N, 5.60; Cl, 27.93.

Infrared analysis.—3.47, $3.52\mu$ (C—H), $6.04\mu$ (C=N).

The aziridine amides of Examples II–V were converted to 2 - (phenoxyalkyl) - 2 - oxazolines of the present invention in an analogous manner. The resulting compounds are identified and their physical properties and chemical and infrared analyses are described in the following examples:

EXAMPLES VII–X

2 - [3 - (2,4 - dichlorophenoxy)propyl] - 2-oxazoline—
Off-white solid, melting point 40.5–43.5° C.

Chemical analysis.—Calculated for $C_{12}H_{13}Cl_2NO_2$ (percent): C, 52.6; H, 4.78; N, 5.11; Cl, 25.9. Found (percent): C, 52.25; H, 4.09; N, 6.21; Cl, 25.25.

Infrared analysis.—$6.04\mu$ (C=N), $8.07\mu$ (C—O).

2 - [1 - (2,4,5 - trichlorophenoxy)ethyl]-2-oxazoline—
Off-white solid, melting point 88.0–91.0° C.

Chemical analysis.—Calculated for $C_{11}H_{10}Cl_3NO_2$ (percent): C, 44.8; H, 3.41; Cl, 36.2. Found (percent): C, 44.40; H, 3.70; Cl, 36.73.

Infrared analysis.—$6.04\mu$ (C=N), $8.07\mu$ (C—O).

2-[1-(4-chloro-2-methylphenoxy)ethyl]-2-oxazoline—
Yellow liquid

Chemical analysis.—Calculated for $C_{12}H_{14}ClNO_2$ (percent): C, 60.2; H, 5.88; N, 5.84. Found (percent): C, 58.75; H, 5.27; N, 6.20.

Infrared analysis.—$5.97\mu$ (C=N); $8.05\mu$ (C—O), $3.40\mu$ (C—H).

2-(4-chlorophenoxymethyl)-2-oxazoline—Sublimed to give a white solid, melting point 52.1–55.6° C.

Chemical analysis.—Calculated for $C_{10}H_{10}ClNO_2$ (percent): C, 56.75; H, 4.77; N, 6.63.

Infrared analysis.—$5.97\mu$ (C=N), $8.14\mu$ (C—O).

As indicated above, the compounds of the present invention can also be prepared from β-chloroethylamides. The following examples illustrate this synthesis route:

EXAMPLE XI

Preparation of N-(2-chloroethyl)-(4-chloro-2-methyl-phenoxy)acetamide

A mixture of 1689 g. (8.0 moles) of 4-chloro-2-methyl-phenoxyacetic acid and 489 g. (8.0 moles) of 2-aminoethanol was heated for 4 hours at 160°. The melt was cooled to 125° and poured slowly into 2500 ml. of benzene while stirring vigorously. To this solution was added slowly at 55° 1047 g. (8.8 moles) of thionyl chloride. The mixture was stirred overnight while cooling to room temperature. Excess benzene was removed with a rotary evaporator, and the residue was stirred with 2 liters of pentane. The mixture was filtered and the solid dried overnight at 45° to give 1580 g. of tan solid. This crude product was recrystallized first from benzene-ligroin and then from acetone-water to give 627 g. of a light brown solid.

Infrared analysis.—3418 cm.$^{-1}$ (N—H), 1679 cm.$^{-1}$ (C=O), 1524 cm.$^{-1}$ (amide II).

EXAMPLE XII

Conversion of n-(2 - chloroethyl) - 4-chloro-2-methylphenoxy)acetamide to 2 - (4 - chloro - 2 - methylphenoxymethyl)-2-oxazoline

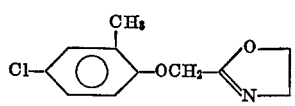

One hundred thirty-one grams, 0.5 mol (131.0 g.) of n-(2 - chloroethyl) - (4 - chloro-2-methylphenoxy)acetamide was added to a solution of 36.5 g. (0.55 mole) of 85% KOH in 625 ml. of methanol. The mixture was heated for 4 hours at 50–55° C., concentrated to half its volume, and filtered. The filtrate was poured into 650 ml. of water, precipitating a tan solid. The product was filtered off and dried to give 100.6 g. of solid product, melting point 60.8–63.3° C.

Chemical analysis.—Calculated for $C_{11}H_{12}ClNO_2$ (percent): C, 58.54; H, 5.31. Found (percent): C, 58.35; H, 5.84.

Infrared analysis.—5.97μ (C=N); 7.99μ (C—O).

Other of the compounds of the present invention may be prepared in a manner analogous to that described in Examples XI and XII.

As indicated above, the compounds of the present invention are selective post-emergence controls for broadleaf weeds in turfs. Such selectivity is shown by the following examples.

EXAMPLE XIII

Representative compounds of the present invention were dispersed in water and sprayed on 2′ x 3′ plots (three replications) at a rate of 10 gallons per 1000 square feet with a hydropneumatic sprayer. The sprays provided active compound at rates of 1.5, 3.0, and 6.0 pounds per acre. Readings taken 12 to 36 days after application showed the following results:

TABLE 1

| Code number of compound | Application rate (lbs./acre) | Tifway Bermudagrass [1] | Cudweed [2] | Dollar weed [3] | Argentine Bahiagrass [4] |
|---|---|---|---|---|---|
| 323 | 1.5 | 0, 0 | 26.7, 36.7 | 80, 70 | 0 |
|  | 3.0 | 0, 0 | 76.7, 70 | 75, 95 | 5 |
|  | 6.0 | 3, 0 | 86.7, 86.7 | 98, 95 | 7.5 |
| 400 | 1.5 | 0, 0 | 20, 20 | 30, 50 | 0 |
|  | 3.0 | 10, 3.3 | 66.7, 85 | 60, 80 | 0 |
|  | 6.0 | 30, 33 | 94.3, 98.3 | 90, 75 | 17.5 |
| 462 | 1.5 | 0, 1.7 | 16.7, 55 | 98, 65 | 15 |
|  | 3.0 | 8.3, 6.7 | 43.3, 43.4 | 100, 40 | 0 |
|  | 6.0 | 0, 0 | 73.3, 53.3 | 100, 75 | 5 |
| 468 | 1.5 | 0, 0 | 53.3, 76.7 | 100, 70 | 5 |
|  | 3.0 | 0, 0 | 85, 96.7 | 100, 90 | 20 |
|  | 6.0 | 16.7, 0 | 81.7, 91.7 | 100, 100 | 25 |

[1] Eight and thirty-six days following application.
[2] Twenty and thirty-six days following application.
[3] Twelve and twenty-eight days following application.
[4] Twenty-eight days following application.

As shown by the data in the foregoing table, the compounds of the invention exhibited a high degree of selectivity between the dicots (cudweed and dollarweed) and turf grasses (Bermuda grass and Bahia grass) present in the plots.

EXAMPLE XIV

In another series of tests, the same representative compounds were applied to plots containing various broadleaf weeds and bluegrass at a rate of five pounds per acre, following the procedure described in Example XIII. The following results were obtained:

TABLE 2

| Code number of compound | Percent kill (mean) | | | |
|---|---|---|---|---|
|  | Pigweed | Clover | Dandelion | Bluegrass |
| 323 | 90 | 50 | 50 | 0 |
| 400 | 90 | 65 | 75 | 0 |
| 462 | 40 | 100 | 50 | 0 |
| 468 | 100 | 100 | 100 | 0 |

As shown by the foregoing table, thhe compounds of the present invention also exhibit a high degree of selectivity between broadleaf weeds and the most popular of the northern grasses.

EXAMPLE XV

In initial field screening tests, two compounds of the present invention were dispersed in water and sprayed on 1′ x 2′ plots which had been mowed earlier at rates providing 1 and 5 pounds of compounds per acre. The plots were read 14 days after application with the following results:

TABLE 3

| Code number of compound | Lbs. of compound per acre | Morning glory | Bluegrass |
|---|---|---|---|
| 400 | 1 | 25 | 0 |
|  | 5 | 95 | 0 |
| 468 | 1 | 88 | 0 |
|  | 5 | 88 | 0 |

Again the compounds provided to be highly selective as between a different broadleaf weed and bluegrass turf.

EXAMPLE XVI

In still another series of tests, Windsor, Merion, and Newport bluegrasses, fine fescue, bent grass, St. Augustine grass, and Bahia grass were all proved to be tolerant to a representative compound of the present invention (472), even at a rate of 16 pounds per acre. In this series of tests, the compound was applied in a spray formulation in the green house. Readings were made 28 days after application. Injury to only three species were observed, and the maximum injury was only ten percent (on Bahia grass). There was no injury to any of the bluegrasses or to the fine fescue.

EXAMPLE XVII

The compounds of the present invention can be applied in granular as well as spray form. This was demonstrated by a series of tests in which representative compounds of the present invention were made up into granular formulations with expanded vermiculite as a carrier in the manner described in U.S. Pats. Nos. 3,076,699, issued Feb. 5, 1963, to Victor A. Renner for Granular Herbicidal Composition and 3,083,089, issued Mar. 26, 1963, to the same patentee for Granular Herbicidal Composition and Methods, both of which are hereby incorporated by reference. These formulations were applied at rates of 2.5, 5, and 10 pounds per acre to 2′ x 3′ bluegrass plots infested with broadleaf weeds (three replications). Readings were made 37 days after application. Results were not entirely consistent, but selective control of broadleaf weeds was obtained in a number of instances.

Specifically, there was no injury to the bluebrass turf in any of the plots to which the compounds were applied. On the other hand, compound 323 gave good control of clover at all rates (75–93% kill) and an 85% kill of dandelions at the lowest rate. Compound 400 gave good control of clover at the lowest rate (87% kill) while compound 462 gave a good (75%) kill of pigweed at the lowest rate and a good kill (88–100%) of clover at all rates. Compound 468 produced a 70% kill of pigweed and a 75% kill of dandelion at the 5 pound per acre rate and good control of clover (88 and 95% kill) at the two lower application rates.

EXAMPLE XVIII

In a series of tests of the type described in Example XVII, compound 472 gave the following results (readings were taken 24 days after application):

TABLE 4

| Application rate (lbs./acre) | Blue-grass | Clover | Chicory | Pigweed | Morning glory |
|---|---|---|---|---|---|
| 5 | 0 | 10 | 75 | 75 | 100 |
| 10 | 0 | 80 | 100 | 100 | 100 |

This data further illustrates the high degree of selectivity which the compounds of the present invention possess. It is also indicative of the variety of broadleaf weeds which can be controlled by these compounds.

As indicated above, compounds of Formula I may possess growth regulating as well as herbicidal activity. The following example demonstrates this valuable characteristic.

EXAMPLE XIX

Compound 472 was dispersed in water as in a number of the preceding examples and applied to St. Augustine grass as a spray and as a drench. Readings taken 30 days after application gave the following results:

TABLE 5

| Application rate (lbs./acre) | Injury (percent) | Quality [1] | Inhibition [2] |
|---|---|---|---|
| 4 (spray) | 0 | 1 | 4 |
| 8 (spray) | 0 | 1 | 5 |
| 8 (drench) | 0 | 1 | 4 |

[1] Quality code: 1–3=excellent; 4–6=fair; 7–9=poor.
[2] Inhibition code: 1=0–20%; 2=21–40%; 3=41–60%; 4=61–80%; 5=81–100%.

As will be apparent from the foregoing, a high degree of growth regulation was obtained in each case. The quality of the turf uniformly remained excellent, and no injury was observed.

In the same series of tests, 472 was also applied as a spray at a rate of 16 pounds per acre. While inhibition was high, this application did produce moderate injury and a corresponding decrease in turf quality. However, this may have been attributable to the conditions under which the compound was applied. In a different series of tests, an identical application of the same compound to St. Augustine grass caused only negligible injury (see Example XVI).

Depending on the particular compound, the type of formulation in which it is incorporated, the characteristics of the particular area to which the formulation is applied, etc., the compounds of the present invention may be applied at single application rates ranging from 1.5 to 16 or more pounds per acre for the purposes discussed above. Applications in this range will in most, if not all, cases provide excellent weed control with minimal or no turfgrass injury.

Also, it is within the province of our invention to use repeat applications of the compounds, normally at rates below the single application rates. Repeat applications at low rates will typically provide control of the broadleaf weeds with a minimum of turf injury in even the most difficult circumstances.

Further, mixtures of the compounds of the present invention may be employed for the purposes described herein, if desired.

As indicated above, the compounds of the present invention can be employed in sprays and in granular formulations. They may also be applied as drenches or combined with a diluent and/or other adjuvants to make a dust and applied with conventional dusting equipment. Depending upon factors such as those discussed above in conjunction with application rates, the proportions of the ingredients in the formulation may vary over a wide range. Generally speaking, however, the proportions will fall within the following limits.

| Ingredients: | Parts by weight |
|---|---|
| Carrier | 8100 |
| Solvent-sticking agent | 301–3213 |
| Oxazoline | 331–4466 |
| Surfactant | 0–964 |

Appropriate carriers include organic solvents, water, vermiculite, perlite, diatomaceous earth, clay, corn cobs, and other materials such as those described in the Handbook of Dust Diluents and Carriers (2d ed.), 1955, which is hereby incorporated by reference. For granular formulations, exfoliated vermiculite is preferred.

One suitable surfactant for use in the formulations described herein is Triton X–100, which is an octylphenoxypolyethoxy ethanol manufactured by Rohm & Haas Company. Other suitable surfactants are those listed in Detergents and Emulsifiers Up-to-Date, 1968, John W. McCutcheon, Inc., which is also hereby incorporated by reference.

The "solvent" may include or be a sticking agent. Suitable "solvents" include Polyvis OSH (a polybutene having a molecular weight of approximately 400 manufactured by the Cosden Oil and Chemical Company) and hexylene glycol. Other suitable solvents-sticking agents are described in U.S. Pats. Nos. 3,076,699 and 3,083,089.

As indicated above, the foregoing patents also disclose methods which may be employed to make granular formulations including the compounds of the present invention. That is, those compounds which are solids at room temperature may be dissolved in an appropriate solvent and adhered to a carrier in the manner disclosed in Pat. No. 3,083,089. Or particles of the compound may be adhered to a carrier with a suitable sticking agent as described in Pat. No. 3,076,699. Those compounds which are liquids can be similarly absorbed on exfoliated vermiculite as described in the foregoing patents.

Diluents, stabilizers, fertilizer and other plant nutrients, other pesticides, flow enhancing agents, adhesives, dyes, and other adjuvants may also be employed in formulations in which the compounds of the present invention are incorporated. This may be done, for example, to make the formulations capable of controlling other types of pests or to produce formulations which may be safely handled or are convenient to apply uniformly and in accurate qualities to the area to be treated. The above-mentioned and other adjuvants which may be employed are described in Chemistry of the Pesticides (3d ed.), Frear, D. Van Nostrand Company, Inc., New York, N.Y., 1955 and in Weed Control (2d ed.), Robbins et al., McGraw-Hill Book Company, Inc., New York, N.Y., 1952, which are also intended to be incorporated by reference herein along with U.S. Pat. No. 3,231,363, issued Jan. 25, 1966, to Victor A. Renner for Process for Making Foamed Ureaformaldehyde Fertilizer, and copending U.S. patent application No. 850,489, filed Aug. 15, 1969, for Foamed Fertilizers and Combination Products which disclose various combination products in which the compounds disclosed herein may be incorporated and methods of preparing such formulations. (See also Pats. Nos. 3,076,699 and 3,083,089.)

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and described to be secured by Letters Patent is:

1. A compound having the formula

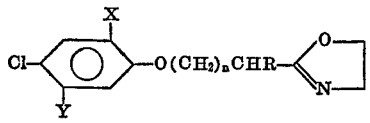

where X is hydrogen, chlorine, or methyl; Y is hydrogen or chlorine; $n$ is 0 or 2; and R is hydrogen or methyl when $n$ is 0 and hydrogen when $n$ is 2.

2. 2-(2-methyl-4-chlorophenoxymethyl)-2-oxazoline.
3. 2-(4-chlorophenoxymethyl)-2-oxazoline.

References Cited
UNITED STATES PATENTS
3,637,726  1/1972  Faith _____ 260—307 F

ALEX MAZEL, Primary Examiner
R. V. RUSH, Assistant Examiner

U.S. Cl. X.R.
71—88; 260—239 E

UNITED STATES PATENT OFFICE
CERTIFICATE OF CORRECTION

Patent No. 3,778,445         Dated December 11, 1973

Inventor(s) Richard J. Timmons and William E. Gallant

It is certified that error appears in the above-identified patent and that said Letters Patent are hereby corrected as shown below:

Column 1, second line following the first structural formula, after chlorine change the "comma" to a --semi-colon--.

Column 2, line 9, change "dchlorobenzoic" to --dichlorobenzoic--.

Column 2, line 12, change "ornaments" to --ornamentals--.

Column 3, Examples II-V, line 14, after "symmetrical" cancel the --parenthesis--.

Column 4, Example VI, the structural formula following the second line should appear as follows:

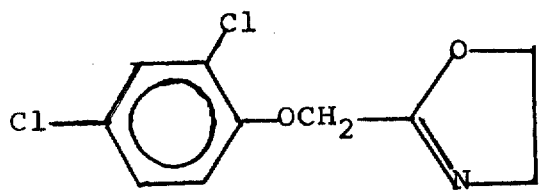

Column 5, Example XII, in the first line after the structural formula, change "0.5 mol (131.0 g.) to --(131.0 g.,0.05 mole)--.

Column 6, Example XIV, in the first line after Table 2, change "thhe" to --the--.

Column 6, Example XV, in the first line after Table 3, change "provided" to --proved--.

UNITED STATES PATENT OFFICE
CERTIFICATE OF CORRECTION

Patent No. 3,778,445　　　　Dated December 11, 1973

Inventor(s) Richard J. Timmons and William E. Gallant

It is certified that error appears in the above-identified patent and that said Letters Patent are hereby corrected as shown below:

Column 6, Example XVII, line 17, change "bluebrass" to --bluegrass--.

Column 9, line 8, change "described" to --desired--.

Signed and sealed this 4th day of June 1974.

(SEAL)
Attest:

EDWARD M. FLETCHER, JR.
Attesting Officer

C. MARSHALL DANN
Commissioner of Patents